Patented Oct. 19, 1948

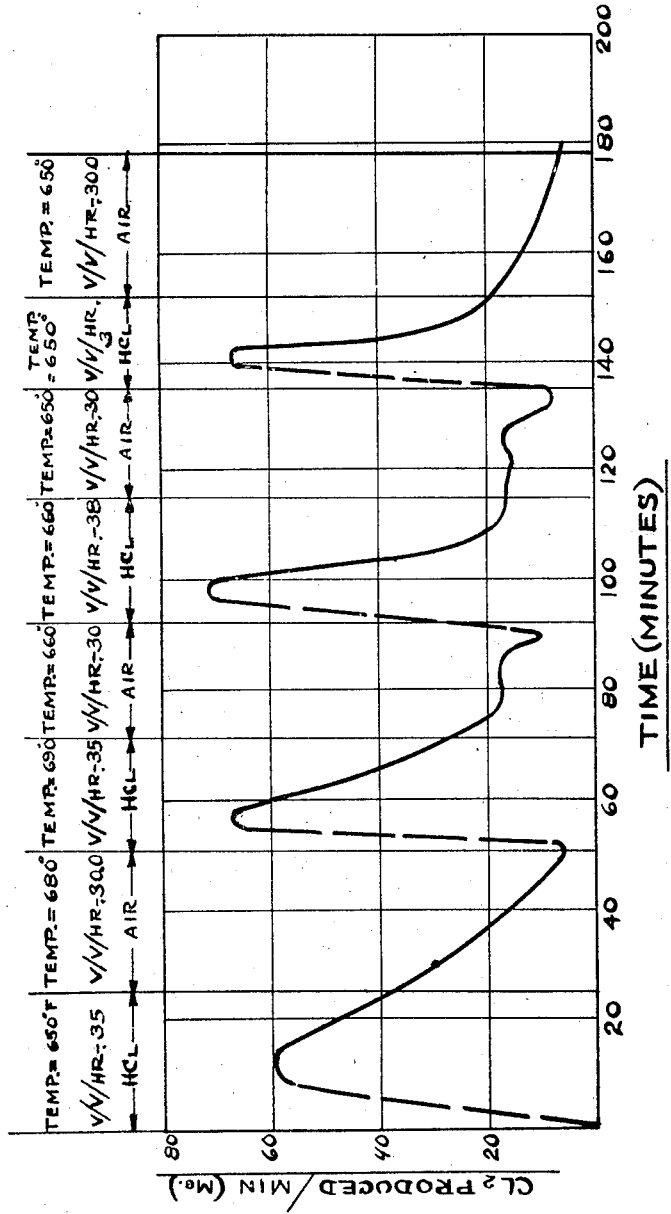

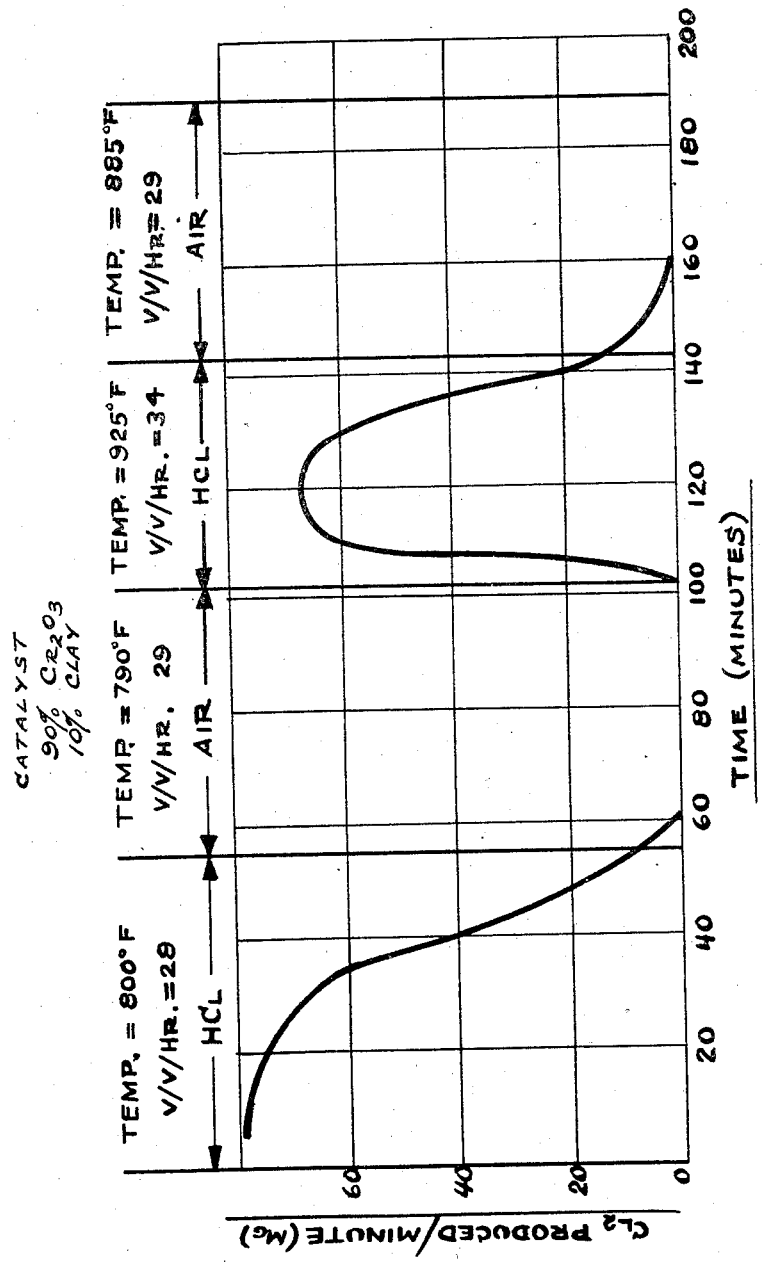

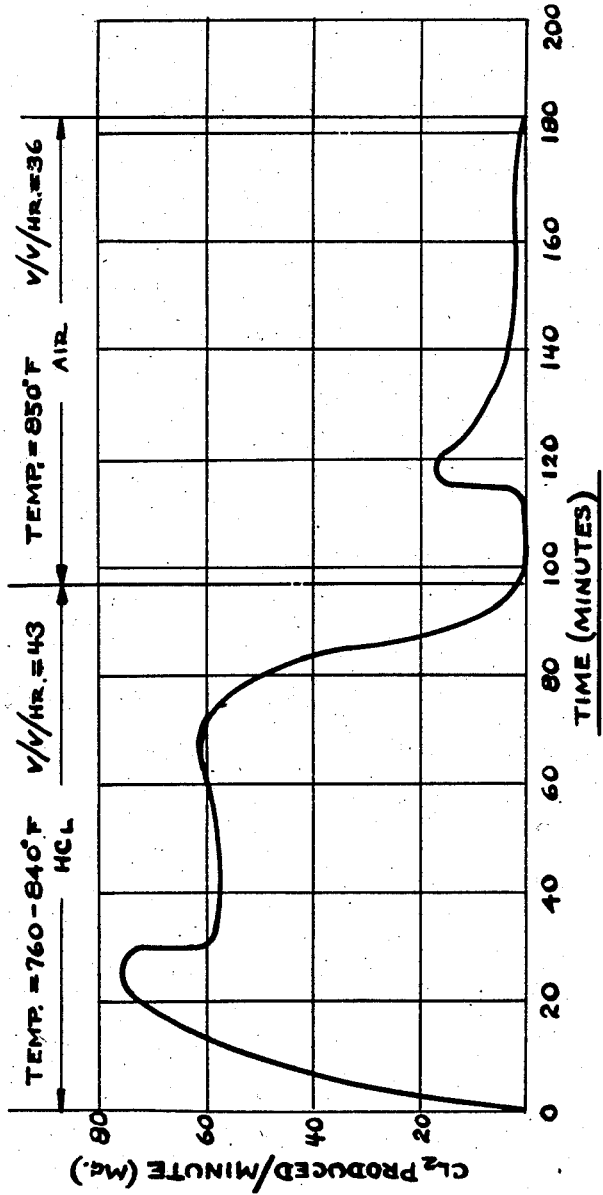

2,451,870

UNITED STATES PATENT OFFICE 2,451,870

CHLORINE MANUFACTURE

Roger W. Richardson and Jerry A. Pierce, Baton Rouge, La., assignors to Standard Oil Development Company, a corporation of Delaware Application September 4, 1942, Serial No. 457,286

9 Claims. (Cl. 23—219)

This invention relates to catalytic reactions involving oxidation. The invention relates in particular to the preparation and utilization of catalyst materials for the oxidation of hydrogen chloride and its more easily decomposable salts as a means of preparing chlorine in high percentage yields.

The Deacon process was the first significant commercial development to utilize the decomposition of hydrogen chloride for the manufacture of chlorine. Cuprous chloride, as a reaction aid, was employed in that process because the compositional interchanges between the chlorides and oxides of copper, as indicated by their heats of formation, are effected with greater ease than those for the otherwise similarly suitable compounds of other elements. The relatively high volatility of cuprous chloride at the reaction temperatures and its sensitivity to poisoning, together with its unsuitability as a contact mass for the production of chlorine in high concentrations, have, however, precluded its extensive utility.

Later developments were concerned with two such processing treatments involving the initial decomposition of hydrogen chloride and/or ammonium chloride vapor in the presence of a metallic oxide and the subsequent release of chlorine from the reaction product by contacting with oxygen-containing gases under conditions to reform the oxide. Processes of this type have been generally held commercially unsatisfactory because of the difficulties of producing chlorine in high concentrations free from hydrogen chloride.

The present invention differs from these prior art processes in combining the advantages of both types of processes without many of their attendant disadvantages. The applicant's invention is concerned largely with the use of a catalyst particularly adapted for the preparation of chlorine directly from hydrogen chloride and processing features attendant upon the use of this new material.

The applicants have found that when certain oxides are employed alone or in admixture or as active compositions on chemically inert carrier materials chlorine can be produced directly from hydrogen chloride in a relatively high degree of concentration and that such oxide masses when spent can be easily reactivated by heating in air. Oxides, which have been found particularly advantageous in this regard, are those of chromium, manganese, and uranium. The activities of the chromium and manganese compounds have been especially investigated, that is, the oxides of the elements having atomic weights from 52 to 55. It has also been found that these various oxides may have added catalyst properties by admixing with them other metallic oxides in smaller proportions. Furthermore, the catalyst materials have been found effective either alone or on carrier materials in fixed bed processing or in gas-solid dispersion type operation. It has also been found, particularly in the case of the chromium compounds, that pre-treatment with oxygen is an important determining factor in the direct production of chlorine in high concentrations from hydrogen chloride. In fact, as distinct from the Deacon process, it has been found more advantageous to effect pre-treatment and regeneration of catalyst masses with oxygen than to add oxygen to the hydrogen chloride gases in contact with the catalyst at reaction temperatures. It is significant that water is produced in both these reactions even though no chromium chloride is found to occur in the spent masses.

The preparation of a catalyst material according to the invention may be effected by taking finely powdered, chemically resistant carrier material, such as silica gel, or titania gel, or kieselguhr, or pumice, adding to a concentrated solution of the oxide, drying and heating under suitable conditions to give a relatively hard mass, preferably of porous texture. Thus to a highly concentrated solution of chromium trioxide, that is, containing about 175 grams of chromium trioxide in 100 cc. of water, 200 grams of powdered carrier material, such as titania gel, are added with vigorous agitation. A sticky, strongly adherent mass is thus obtained and molded into a large cake or ball. The mass is then dried in air by heating to a temperature of about 200° F. and subsequently heating in a furnace to 850° F. or even higher. During the drying and roasting processes, the chromium trioxide releases about one-half mole of oxygen, a substantial portion of which is occluded within the catalyst mass. Thus a catalyst material is prepared, which is relatively light in weight, porous in structure, and of mechanical strength sufficient to endure hard usage.

The material thus prepared has about a 77% capacity for converting hydrogen chloride to chlorine in high concentration and the spent material is readily reactivated in air. The physical characteristics of the material are indicated by specific gravity data. Chromium sesquioxide has a specific gravity of 5, titania gel has an apparent density of about 1, while the catalyst mass has an apparent density of about 1.

Other catalyst materials were similarly prepared as indicated by further illustrations.

Titania gel is immersed in a solution of chromium nitrate or the solution may be sprayed over the titania gel so as to give, when the product is heated to decompose the nitrate to form the oxide and dried, a resultant product containing about 5% by weight of chromium sesquioxide ($Cr_2O_3$). The catalyst mass thus prepared has a conversion efficiency of about 82% in fixed bed operation and produces chlorine of about 88% concentration.

Another method of preparation is to mix pure chromium sesquioxide with 10% by weight of powdered ball clay. Then press the mass into pellets and heat in air to about 850° F. for several hours. The resultant material is suitable as an oxidizing catalyst in a variety of reactions. When employed in the oxidation of hydrogen chloride, chlorine of about 95% concentration may be obtained.

Another product may be prepared by impregnating pumice or similar material with uranium nitrate in a manner such, that after heating, the uranium content is about 5%. The product can be suitably used in many oxidizing reactions and is particularly effective in the oxidation of hydrogen chloride to chlorine.

In another product, uranium oxide, chromium oxide, and cerium oxide may be impregnated in a suitable carrier, such as silica gel, from solutions of their nitrates and the material dried and then heated to decompose the nitrates so as to leave the finely divided oxides in the pore surfaces of the carrier material. The percentage contents of the various oxides may vary. A typically advantageous material for oxidizing reactions contains about 5% uranium oxide, 5% chromium oxide and 0.5% cerium oxide.

Suitable catalyst materials containing manganese may be prepared by granulating to 12–20 mesh pyrolusite mineral containing a high percentage of $MnO_2$ and then heating overnight to about 300° F.

While the above preparations can be advantageously employed in the oxidation of hydrogen chloride to chlorine, it is particularly advantageous to treat the masses with oxygen-containing gases prior to use. Usually treatment with oxygen-containing gases at temperatures between about 500° F. and 900° F. for between 2 and 20 hours is advantageous and provides in most cases the means of processing to obtain yields of chlorine in about 90% concentration. Similar pre-treatment with other gases has not been found to have the same effect. Thus when samples of catalyst masses, containing chromium sesquioxide, were treated with oxygen-containing gases and nitrogen for purposes of comparison, the following data were obtained in fixed bed operation:

| Catalyst Treatment | Per cent HCl Conversion |
|---|---|
| Activated in Air | 32.3 |
| Regenerated in Air | 24.0 |
| Activated in $N_2$ | 1.0 |
| Regenerated in $N_2$ | 4.5 |
| Do | 4.9 |

Thus it is highly desirable to pre-treat with oxygen as well as to regenerate in oxygen the catalyst masses.

These effects of oxygen and nitrogen on the catalyst masses are particularly significant in that no chromium chlorides are obtained by washing spent masses with water and in that no such compounds have yet been detected as reaction products. On the other hand, the production of water as a result of contacting the spent masses with oxygen clearly indicates that hydrogen is held at the surface of the catalyst. This hydrogen appears to be adsorbed at the surface since it is not physically removable by passage of a stream of nitrogen. Significant in this regard is also the following comparison of data:

| Catalyst, per cent $Cr_2O_3$ | 5 | 5 | 10 | 20 | 100 |
|---|---|---|---|---|---|
| Gm. $Cl_2$/Gm. Cat./Hour | 0.023 | 0.029 | 0.023 | 0.030 | 0.025 |
| Gm. $Cl_2$/Gm. $Cr_2O_3$/Hour | 0.45 | 0.58 | 0.23 | 0.15 | 0.025 |

It would appear thus that the most active masses are those containing the smallest amounts of the chromium oxide and, therefore, that the reaction is determined largely by surface area.

According to the invention, the general method of processing is to have the chlorine released from the hydrogen chloride containing gases at temperatures ranging from about 400° F. to about 1200° F., and preferably from 800° F. to 900° F., by passing such gases over a suitable catalyst. The gaseous hydrogen chloride, either free or occurring as a product of vapor dissociation, is treated in this manner. Chlorine gas in high concentrations is directly produced from hydrogen chloride without appreciable quantities of extraneous gases present as a contaminant. At the end of a period of time which can be accurately predetermined, the rate of production of chlorine rapidly decreases and the output gas consists chiefly of hydrogen chloride. By anticipating this cessation of the reaction, the input of hydrogen chloride is stopped and the catalyst is prepared for another productive cycle by passing oxygen-containing gases, usually air, therethrough. The length of the active chlorine-producing cycle depends upon the nature and the amount of the catalyst employed and the space volume relationship. Calculations based upon these features permit the determination of the length of the productive cycle and thus of the time period of the cycle to meet the requirements of the unit and other manufacturing conditions. The oxygen-containing gases are passed through the spent catalyst materials at temperatures between about 750° F. and 1200° F. and preferably between about 800° F. and about 950° F. The amount of oxygen in the oxygen-containing gases passed over the spent catalyst material is approximately about that of the hydrogen chloride initially passed over the catalyst material and at about the same rate as that of the hydrogen chloride in the previous operation.

It may be particularly advantages to effect the production of chlorine from hydrogen chloride and the regeneration of the spent material by effecting the reactions in systems in which the catalyst materials are in a fluidized condition in their respective reactant gases. In this type of operation, the catalyst is pulverized so as to be essentially between 200 and 400 mesh. When the catalyst material is so finely divided, a gas-solid dispersion is readily formed by adding the material to a gaseous stream having a velocity above about 4 feet per second. The gases and the powdered material may be introduced into the reaction zones separately or as a suspension. During the periods in the reaction zones, the suspensions are maintained in a relatively dense fluidized state. The reaction zones are so arranged as to permit the general upward flow of gases and the velocities in the reaction zones are so controlled as to insure that a substantial quantity of the fluidized solid particles is maintained in the dense phase, and that the fluidized mass behaves as a liquid. Most of the solid particles are withdrawn directly from the bottom of the reaction zones in the highly dense phase in much the same manner as a liquid may be removed from the bottom of a containing vessel. In order to supply the pressure required in transferring the finely divided solid materials from one reactor to another, it is preferable to use long vertical columns of highly dense fluidized mixtures in standpipes. By adding small amounts of aeration gases to the standpipe at various points, the fluidized mixtures are maintained in satisfactory fluidized states so that pressure is built up due to the weight of the material in the columns. The standpipes are made high enough to provide a pressure at the basis sufficient to convey the fluidized mixtures through the system.

During the passage of the gas-solid dispersion through the reaction zones, fairly complete reaction occurs between the gases and the solids. Thus when through one reaction zone is passed a fluidized mass of catalyst materials in hydrogen chloride, and the thus spent solid material incorporated in a gas-solid dispersion in oxygen-containing gases, which passes through the second reaction zone, processing is advantageously effected on a continuous scale.

Although in one manner of operation, according to this fluidized reaction treatment, some of the finely powdered solid material may pass upwards above the general level of the fluidized mixtures in the reaction zones, most of the material may be made to remain as a relatively dense fluidized mixture in the zones. Thus the larger proportion of the fluidized mixtures may be withdrawn from near the base of each of the reaction zones as highly dense fluidized mixtures and only minor amounts of fluidized masses allowed to pass upwards to suitably placed solid separating devices to extract the solid material.

In contrast to this method of operation the fluidized mass may be allowed to pass entirely overhead and separation made of the solid materials in a number of solid separating devices, such as cyclone separators. In this manner of operation there is a relatively large pressure drop through the solid separating devices due to the high concentrations of the solid materials in the suspensions. Standpipes are used for transferring the fluidized mixtures from low pressure zones to high pressure zones.

Processing, when the fluidized mixture is taken completely overhead, is considered less desirable than that in which a larger proportion of the fluidized mass is not taken overhead, but separated near the base of the reaction zones. In either method, the reactant gases are in an ever changing intimate contact with the finely divided solid particles under easily controllable temperature and pressure conditions. One reaction vessel may be placed on a higher level than the other so that the reaction vessels may be operated under different pressures. Furthermore, means may be provided in the reaction zones for cooling or supplying heat as required by recirculating heated or cooled material from other states in the processing, or by recirculating some of the fluidized mixtures through heat exchange devices. Also, since the solid material is added to the reaction zones in the finely divided state, a more satisfactory degree of reaction can be made to occur than in fixed bed operation. Moreover, processing in this manner has the advantage that regeneration of the spent material can be effected in a reaction zone, particularly adapted for such, rather than by intermittent introduction of oxygen-containing gases over a stationary catalyst bed.

The following examples are presented to convey a fuller appreciation of the invention:

*Example 1*

A catalyst material of 5% chromium sesquioxide on titania gel was prepared according to the general method previously described and then heated in air at 500° F. for 16 hours. Hydrogen chloride was passed at a fixed rate over a bed of this catalyst disposed in a reaction tube at 850° F. until the production of chlorine showed a sharp decrease, then the hydrogen chloride supply cut off and air at a fixed rate passed over. The following data were thus obtained:

| Gas Cycle | HCl | Air | HCl | Air | HCl | Air |
|---|---|---|---|---|---|---|
| Temperature, °F | 850 | 860 | 850 | 860 | 850 | 850 |
| V./V./Hour | 35.8 | 30 | 32.0 | 30 | 35.6 | 30 |
| Time, Minutes | 31 | 41 | 30 | 32 | 23 | 33 |
| HCl Input, Gms | 2.89 | | 2.5 | | 2.13 | |
| $Cl_2$ Produced, Gms. (Expressed as HCl) | 1.64 | 0.68 | 1.07 | 0.73 | 0.59 | 0.76 |
| HCl Unreacted | 0.47 | 0.28 | 0.16 | 0.16 | 0.10 | 0.435 |
| Conversion, per cent HCl to $Cl_2$ | 56.7 | 23.5 | 42.8 | 29.2 | 27.7 | 35.6 |
| $Cl_2$ Concentration,[1] per cent (Vol.) | 63.5 | 8.9 | 77.2 | 12.1 | 75.0 | 11.2 |
| Per cent Total $Cl_2$ | 70.8 | 29.2 | 59.5 | 40.5 | 43.7 | 56.3 |
| Total $Cl_2$ Gms | 2.32 | | 1.80 | | 1.35 | |
| Conversion, per cent | 80.3 | | 72.1 | | 63.4 | |
| HCl Balance, per cent | 106.2 | | 84.9 | | 88.4 | |

| Overalls: | |
|---|---|
| Conversion, per cent | 72.7 |
| HCl Balance | 94.1 |
| Concentration $Cl_2$ per cent[1] (Vol.)— | |
| HCl Cycles | 69.2 |
| Air Cycles | 10.7 |
| $Cl_2$ Distribution From— | |
| HCl Cycles, per cent | 60 |
| Air Cycles, per cent | 40 |
| Gm. $Cl_2$/Gm. Cat./Hr. (HCl Cycles) | 0.0225 |
| Gm. $Cl_2$/Gm. Active Constituent/Hr. (HCl Cycles) | 0.45 |

[1] Disregarding the presence of water vapor.

The above data show an over-all conversion of about 73% hydrogen chloride to chlorine in the three cycles at a temperature of 850° F. In general, the greater percentage of the chlorine was obtained in the hydrogen chloride cycle and the over-all concentration of the chlorine was about 69%. On the other hand about 40% of the chlorine was obtained during the air cycle at a concentration of about 10%.

Example 2

The catalyst material of 5% chromium sesquioxide on titania gel and preheated in air at 850° F. for 18 hours was prepared according to the general method previously described. The processing was effected as in Example 1 except that the temperature of operation was between 650° F. and 690° F.

These data indicate that at the lower temperature, less conversion is obtained (about 63% as compared to 73% in Example 1). However, in this lower temperature processing the catalyst is found to maintain its activity better and also that there is a greater concentration of the chlorine in in Examples 1 and 2 in being of the order of about 20 v./v./hour to that of about 35 v./v./hour.

| Gas Cycle | HCl | Air |
|---|---|---|
| Temperature, °F | 835 | 835 |
| V./V./Hour | 21.5 | 17.5 |
| Time (Minutes) | 43 | 61 |
| HCl Input, Gms | 2.454 | |
| Cl₂ Produced, Gms. (Expressed as HCl) | 1.018 | 0.839 |
| HCl Unchanged | 0.38 | 0.50 |
| Conversion, per cent HCl to Cl₂ | 41.4 | 34.2 |
| Cl₂ Concentration, per cent¹ (Vol.) | 57.3 | 11.3 |
| Per cent Total Cl₂ | 54.9 | 45.1 |
| | | |
| Total Cl₂, Gms | 1.857 | |
| Conversion, per cent | 75.6 | |
| HCl Balance, per cent | 114.1 | |
| Overall: | | |
| Conversion, per cent | 75.9 | |
| HCl Balance | 114.1 | |
| Concentration Cl₂, per cent¹ (Vol.)— | | |
| HCl Cycles | 57.3 | |
| Air Cycles | 11.3 | |
| Cl₂ Distribution From— | | |
| HCl Cycles, per cent | 54.9 | |
| Air Cycles, per cent | 45.1 | |
| Gm. Cl₂/Gm. Cat./Hour (HCl Cycles) | 0.016 | |
| Gm. Cl₂/Gm. Active Constituent/Hour (HCl Cycles) | 0.32 | |

¹ Disregarding the presence of water vapor.

| Gas Cycle | HCl | Air | HCl | Air | HCl | Air | HCl | Air |
|---|---|---|---|---|---|---|---|---|
| Temperature, °F | 650 | 680 | 690 | 660 | 660 | 650 | 650 | 650 |
| Volume of Gas per Volume of Catalyst per Hour (V./V./Hour) | 34.3 | 30 | 35.6 | 30 | 38.1 | 30 | 40.1 | 30 |
| Time, Minutes | 26 | 23 | 23 | 20 | 14 | 26 | 17 | 26 |
| HCl Input, Gms | 2.32 | | 1.30 | | 1.39 | | 1.77 | |
| Cl₂ Produced, Gms. (Expressed as HCl) | 0.981 | 0.293 | 0.808 | 0.278 | 0.678 | 0.30 | 0.655 | 0.272 |
| HCl Unchanged | 0.113 | 0.621 | 0.079 | 0.405 | 0.10 | 0.327 | 0.346 | 0.395 |
| Conversion, per cent HCl to Cl₂ | 42.3 | 12.6 | 62.1 | 21.4 | 48.8 | 21.5 | 37.0 | 15.4 |
| Cl₂ Concentration,¹ per cent (Vol.) | 81.3 | 5.7 | 83.9 | 6.6 | 77.3 | 6.0 | 48.6 | 5.3 |
| Per cent Total Cl₂ | 77 | 23 | 74.5 | 25.5 | 69.4 | 30.6 | 70.6 | 29.4 |
| | | | | | | | | |
| Total Cl₂ Gms | 1.274 | | 1.086 | | 0.978 | | 0.927 | |
| Conversion, per cent | 55.0 | | 83.4 | | 70.4 | | 52.4 | |
| HCl Balance, per cent | 86.6 | | 120.8 | | 101.0 | | 94.2 | |
| | | | | | | | | |
| Overall: | | | | | | | | |
| Conversion, per cent | 62.8 | | | | | | | |
| HCl Balance | 98.3 | | | | | | | |
| Concentration Cl₂ per cent¹ (Vol.)— | | | | | | | | |
| HCl Cycles | 71.0 | | | | | | | |
| Air Cycles | 5.9 | | | | | | | |
| Cl₂ Distribution From— | | | | | | | | |
| HCl Cycles, per cent | 73.3 | | | | | | | |
| Air Cycles, per cent | 26.7 | | | | | | | |
| Gm. Cl₂/Gm. Cat./Hr. (HCl Cycles) | 0.029 | | | | | | | |
| Gm. Cl₂/Gm. Active Constituent/Hr. (HCl Cycles) | 0.58 | | | | | | | |

¹ Disregarding the presence of water vapor.

the hydrogen chloride cycle. The course of this experimental work is graphically represented in Figure. 1.

Example 3

In this illustration the effect of lower feed rate is demonstrated. The catalyst was the same as employed as in Example 1. The feed rate in the present illustration compares with that employed

Example 4

In this example, the catalyst materials prepared and the processing employed were similar to those described in Example 1. This example is presented to show the effect of varying the percentage of chromium oxide in the catalyst material. The following comparison of data was obtained when catalysts containing 20%, 36.6% and 60% of chromium sesquioxide on titania gel were employed:

| Gas Cycle | 20% $Cr_2O_3$ | | 36.6% $Cr_2O_3$ | | 60% $Cr_2O_3$ | |
|---|---|---|---|---|---|---|
| | HCl | Air | HCl | Air | HCl | Air |
| Temperature, °F | 800–850 | 750–800 | 880 | 880 | 850 | 855 |
| V./V./Hour | 57.0 | 47.5 | 29.2 | 28.5 | 40.3 | 33.5 |
| Time (Minutes) | 65 | 74 | 53 | 65 | 41 | 50 |
| HCl Input, Gms | 6.04 | | 4.28 | | 3.81 | |
| $Cl_2$ Produced, Gms. (Expressed as HCl) | 2.33 | 1.0 | 2.00 | 0.584 | 1.86 | 0.088 |
| HCl Unchanged | 1.24 | 0.79 | 1.38 | 0.91 | 0.177 | 0.379 |
| Conversion, per cent HCl to $Cl_2$ | 38.6 | 16.5 | 46.6 | 13.6 | 48.8 | 2.3 |
| $Cl_2$ Concentration, per cent [1] (Vol.) | 48.6 | 7.2 | 42.0 | 4.7 | 84.0 | 1.0 |
| Per cent Total $Cl_2$ | 70 | 30 | 77.2 | 22.8 | 95.5 | 4.5 |
| Total $Cl_2$, Gms | 3.33 | | 2.58 | | 1.95 | |
| Conversion, per cent | 55.2 | | 60.4 | | [2] 51.2 | |
| HCl Balance, per cent | 88.8 | | 113.7 | | 66.0 | |
| Overall: | | | | | | |
|   Conversion, per cent | 55.2 | | 60.4 | | [2] 51.2 | |
|   HCl Balance | 88.8 | | 113.7 | | 66.0 | |
|   Concentration $Cl_2$ per cent [1] (Vol. —) | | | | | | |
|     HCl Cycles | 48.6 | | 42.0 | | 84.0 | |
|     Air Cycles | 7.2 | | 4.7 | | 1.0 | |
|   $Cl_2$ Distribution From— | | | | | | |
|     HCl Cycles, per cent | 70 | | 77.2 | | 95.5 | |
|     Air Cycles, per cent | 30 | | 22.8 | | 4.5 | |
| Gm. $Cl_2$/Gm. Cat./Hour (HCl Cycles) | 0.030 | | 0.023 | | 0.041 | |
| Gm. $Cl_2$/Gm. Active Constituent/Hour (HCl Cycles) | 0.15 | | 0.063 | | 0.068 | |

[1] Disregarding the presence of water vapor.
[2] 77.6% on 100% HCl Bal.)

Example 5

In this example the catalyst prepared, as in Example 1, was composed of chromium sesquioxide with 10% ball clay as binder. The mass was heated in air at 850° F. for 3½ hours. The catalyst mass employed in the form of pellets in the reaction vessel.

| Gas Cycle | HCl | Air | HCl | Air |
|---|---|---|---|---|
| Temperature, ° F | 800 | 790 | 925 | 885 |
| V./V./Hour | 28.1 | 28.5 | 34.2 | 28.5 |
| Time (Minutes) | 55 | 47 | 41 | 43 |
| HCl Input, Gms | 4.18 | | 3.81 | |
| $Cl_2$ Produced, Gms. (Expressed as HCl) | 2.41 | 0.01 | 2.07 | 0.04 |
| HCl Unchanged | 0.23 | 0.97 | 1.18 | 1.23 |
| Conversion, per cent HCl to $Cl_2$ | 57.6 | 0.0 | 54.3 | 1.1 |
| $Cl_2$ Concentration, per cent [1] (Vol. %) | 84.0 | 0.0 | 46.9 | 0.4 |
| Per cent Total $Cl_2$ | 99.6 | 0.4 | 98.0 | 2.0 |
| Total $Cl_2$, Gms | 2.42 | | 2.11 | |
| Conversion, per cent | 57.8 | | 55.4 | |
| HCl Balance, per cent | 96.6 | | 118.8 | |
| Overall: | | | | |
|   Conversion, per cent | 56.6 | | | |
|   HCl Balance | 101.8 | | | |
|   Concentration $Cl_2$ per cent [1] (Vol.)— | | | | |
|     HCl Cycles | 61.3 | | | |
|     Air Cycles | | | | |
|   $Cl_2$ Distribution From— | | | | |
|     HCl Cycles, per cent | 99.0 | | | |
|     Air Cycles, per cent | 1.0 | | | |
| Gm. $Cl_2$/Gm. Cat./Hour | 0.021 | | | |
| Gm. $Cl_2$/Gm. Chromia/Hour | 0.023 | | | |

[1] Disregarding the presence of water vapor.

The above data show that most of the chlorine was obtained in the hydrogen chloride cycle. The significance of this feature is that in this work less difficulty was experienced in determining the point in the cycle at which each reaction was relatively terminated and there was, therefore, less overlapping between the cycles. The data clearly indicate that in the first cycle substantially all the chlorine was obtained. The overall conversion was not as good as that obtained in the previous examples, but the selectivity of the reaction is better since 99% of the total chlorine is produced in the hydrogen chloride cycle and at a concentration of about 60% by volume. In Figure 2 a graphical representation is presented of this experimental work.

Example 6

In this example the catalyst mass is made with an alumina base material containing 0.6% cerium and 1.2% potassium and 11% chromium sesquioxide and then heated in air at 750° F. for 2 hours. The following data were obtained from processing as in Example 1:

| Gas Cycle | HCl | Air |
|---|---|---|
| Temperature, °F | 760–840 | 840–860 |
| V./V./Hour | 42.8 | 36 |
| Time (Minutes) | 97 | 85 |
| HCl Input, Gms | 9.02 | |
| $Cl_2$ Produced, Gms. (Expressed as HCl) | 4.42 | 0.385 |
| HCl Unchanged | 0.484 | 0.908 |
| Conversion per cent HCl to $Cl_2$ | 49.1 | 4.25 |
| $Cl_2$ Concentration, per cent [1] (Vol. per cent) | 82.2 | 2.5 |
| Per cent Total $Cl_2$ | 92.0 | 8.0 |
| Total $Cl_2$, Gms | 4.804 | |
| Conversion, per cent | 53.3 ([2] 77.5) | |
| HCl Balance, per cent | 68.8 | |
| Overall: | | |
|   Conversion, per cent | 53.3 ([2] 77.5) | |
|   HCl Balance | 68.8 | |
|   Concentration $Cl_2$ per cent[1] (Vol.)— | | |
|     HCl Cycles | 82.2 | |
|     Air Cycles | 2.5 | |
|   $Cl_2$ Distribution From— | | |
|     HCl Cycles, per cent | 92.0 | |
|     Air Cycles, per cent | 8.0 | |
| Gm. $Cl_2$/Gm. Cat./Hour | 0.037 | |
| Gm. $Cl_2$/Gm. Chromia/Hour | 0.34 | |

[1] Disregarding the presence of water vapor.
[2] On 100% recovery.

The material balance on this run indicates that some of the hydrogen chloride was absorbed or otherwise retained in the catalyst mass. In general, however, the results were quite similar to those obtained with the titania gel catalyst masses. Figure 3 graphically illustrates the course of the experimental work.

*Example 7*

A catalyst material was prepared by granulating to 12-20 mesh pyrolusite mineral containing 79% $MnO_2$ and heating overnight at 300° F. 174 grams of the product was of 70 cc. volume.

When 70 cc. of this material was used in a reaction vessel as, in Example 1, 15.42 grams of chlorine (as HCl) was produced from 56.2 grams of hydrogen chlorine, that is a percentage conversion of 20.5%. In the total production of chlorine 75% was produced in the hydrogen chloride cycle and 25% in the air treatment cycle. In addition to the direct production of chlorine, some of the hydrogen chloride was held in the catalyst at the end of the run.

In the prior art, the more important processes for preparing chlorine from hydrogen chloride have employed as reaction aids actively variable multivalent elements combined as their oxides or chlorides. These multivalent elements were chosen because the heats of formation of the oxide and chloride compounds indicated small relative differences. These relatively small differences and heat effects indicated that it would be relatively easy to effect an exchange of chlorine for oxygen in the presence of excess chlorine under moderate reaction conditions and then to treat the resultant chloride compound thus formed in the presence of excess oxygen under moderate reaction conditions to reform the oxide and release free chlorine. The Deacon process is possibly of this two-stage type also, even though it would appear that by passing hydrogen chloride and oxygen over cuprous chloride, the chlorine is directly produced from the hydrogen chloride by the oxidation of the hydrogen in the hydrogen chloride.

The process of the present invention clearly differs from all prior art processes as evident by the higher yields of chlorine at corresponding conditions of operation. The mechanism of the process is not fully understood, but it appears that at the surface of the catalyst mass a decomposition of the hydrogen chloride occurs in which some of the hydrogen is directly oxidized to water and other quantities of hydrogen are adsorbed on the surface. This adsorbed hydrogen is subsequently removed in the subsequent regeneration of the spent material with the production of water. From other studies of the behavior of the catalyst masses, it is indicated that in the pretreatment with oxygen of fresh catalyst masses, oxygen is also adsorbed at the surface of the catalyst and that it is this adsorbed oxygen (which reacts with some of the hydrogen of the hydrogen chloride in subsequent operations) which is one of the immediate causes of the release of free chlorine. It would appear that in order to explain the presence of adsorbed hydrogen on the surface of the catalyst, that in addition to the direct oxidation of the hydrogen chloride at the surface of the catalyst, there is also a cracking effect at the surface of the catalyst of the hydrogen chloride, thus producing free chlorine and hydrogen adsorbed on the surface.

What is claimed is:

1. A continuous process for the preparation of chlorine directly from hydrogen chloride without any intermediate formation of chlorides on the catalyst, which consists in passing hydrogen chloride gas at a rate between 20 and 60 volumes of gas per volume of catalyst per hour over a catalyst mass pre-heated between 2 and 18 hours in an oxygen-containing gas to a temperature between about 500° F. and 850° F., said catalyst mass containing chromium sesquioxide supported on titania gel, the hydrogen chloride gas being contacted with the catalyst mass, at a temperature from about 650° F. to about 850° F. until the rate of production of chlorine rapidly decreases as the catalyst mass becomes spent, disconnecting the hydrogen chloride supply, then passing air at a rate between 20 and 40 volumes of gas per volume of catalyst per hour over the spent mass for a period of time about the same as that during which the hydrogen chloride was passed over the initial mass, and at a temperature between about 800° F. and about 900° F., disconnecting the air supply and repeating the cycle of passing the hydrogen chloride over the mass and the subsequent passing of air over the spent mass.

2. A continuous process according to claim 1 in which the rate on which the hydrogen chloride is passed over the catalyst mass is between 30 and 35 volumes of hydrogen chloride per volume of catalyst per hour.

3. A process for catalytically preparing chlorine directly from hydrogen chloride without any intermediate formation of chlorides on the catalyst which consists in contacting hydrogen chloride in the absence of added oxygen at a temperature between 400 and 1200° F. with a catalyst comprising an oxide of an element selected from the group consisting of chromium and manganese supported on a porous carrier which catalyst has been pretreated with an oxygen-containing gas at about 500° F. and continuing the passage of the hydrogen chloride over the said catalyst until the evolution of chlorine is substantially reduced, and then without materially changing the temperature reactivating the catalyst by passing an oxygen-containing gas thereover and repeating the cycle with hydrogen chloride and then with air.

4. A process for preparing chlorine according to claim 3 in which the catalyst is an oxide of chromium.

5. A process for preparing chlorine according to claim 3 in which the catalyst is an oxide of manganese.

6. A process according to claim 3 in which the hydrogen chloride is contacted with the catalyst mass at a temperature between about 800° F. and about 900° F.

7. A continuous process for the catalytic preparation of chlorine directly from hydrogen chloride without any intermediate formation of chlorides on the catalyst which consists in contacting hydrogen chloride with a catalyst mass preheated in an oxygen-containing gas to a temperature between about 500° F. and about 850° F., said catalyst mass containing an oxide of chromium as the essentially active ingredient, the hydrogen chloride being contacted with the catalyst mass at a temperature between 800° and 900° F. until the rate of production of chlorine rapidly decreases as the catalyst mass becomes a spent mass, then discontinuing the hydrogen chloride supply and contacting the spent mass with an oxygen-containing gas at a temperature between about 800 and 950° F. at a rate and volume about the same as that employed in the said previous contacting of a catalyst mass with hydrogen chloride, discontinuing the supply of oxygen-containing gas and then repeating the cycle of contacting the catalyst mass with hydrogen chloride and the subsequent contacting of the spent mass with oxygen-containing gas.

8. A continuous process according to claim 7 in which the hydrogen chloride is contacted with the said catalyst mass, when the catalyst mass consisting of said chromium oxide is supported on a chemically inert carrier material and is in a finely divided state in a gas-solid dispersion with hydrogen chloride; and the spent mass is contacted in a gas-solid dispersion in an oxygen-containing gas.

9. A continuous process for the catalytic preparation of chlorine directly from hydrogen chloride without any intermediate formation of chlorides on the catalyst which consists in passing hydrogen chloride at a rate between 20 and 60 volumes of gas per volume of catalyst per hour over a catalyst mass preheated between 2 and 18 hours in an oxygen-containing gas to a temperature between about 500° F. and 850° F., said catalyst mass containing chromium sesquioxide supported on titania gel, the hydrogen chloride being contacted with said catalyst mass at a temperature of 850° F. until the rate of production of chlorine rapidly decreases as the catalyst mass becomes a spent mass, then disconnecting the hydrogen chloride supply and passing air at a rate between 20 and 40 volumes of gas per volume of catalyst per hour over the spent mass for a period of time about the same as that during which the hydrogen chloride was passed over the initial mass and at a temperature of about 850° F., disconnecting the air supply and repeating the cycle of passing the hydrogen chloride over the thus reactivated catalyst mass and the subsequent passing of air over the spent mass.

ROGER W. RICHARDSON.
JERRY A. PIERCE.

REFERENCES CITED

The following references are of record in the file of this patent:

UNITED STATES PATENTS

| Number | Name | Date |
|---|---|---|
| 134,190 | Aubertin | Dec. 24, 1872 |
| 348,348 | Rumpf | Aug. 31, 1886 |
| 463,767 | Wilde et al. | Nov. 24, 1891 |
| 1,355,105 | Canon | Oct. 5, 1920 |
| 2,034,896 | Calcott | Mar. 24, 1936 |
| 2,191,981 | De Jahn | Feb. 27, 1940 |
| 2,206,399 | Grosvenor et al. | July 2, 1940 |
| 2,271,056 | Balcar | Jan. 27, 1942 |
| 2,288,320 | Morey | June 30, 1942 |
| 2,304,128 | Thomas | Dec. 8, 1942 |

FOREIGN PATENTS

| Number | Country | Date |
|---|---|---|
| 1,312 | Great Britain | 1870 |
| 3,483 | Great Britain | 1874 |
| 8,308 | Great Britain | 1886 |

OTHER REFERENCES

Lunge, Sulfuric Acid and Alkali, vol. III, London 1911, p. 498.